Oct. 4, 1949.  J. R. JOHNSON  2,483,466
QUILTING MACHINE
Filed Dec. 28, 1945   12 Sheets-Sheet 1
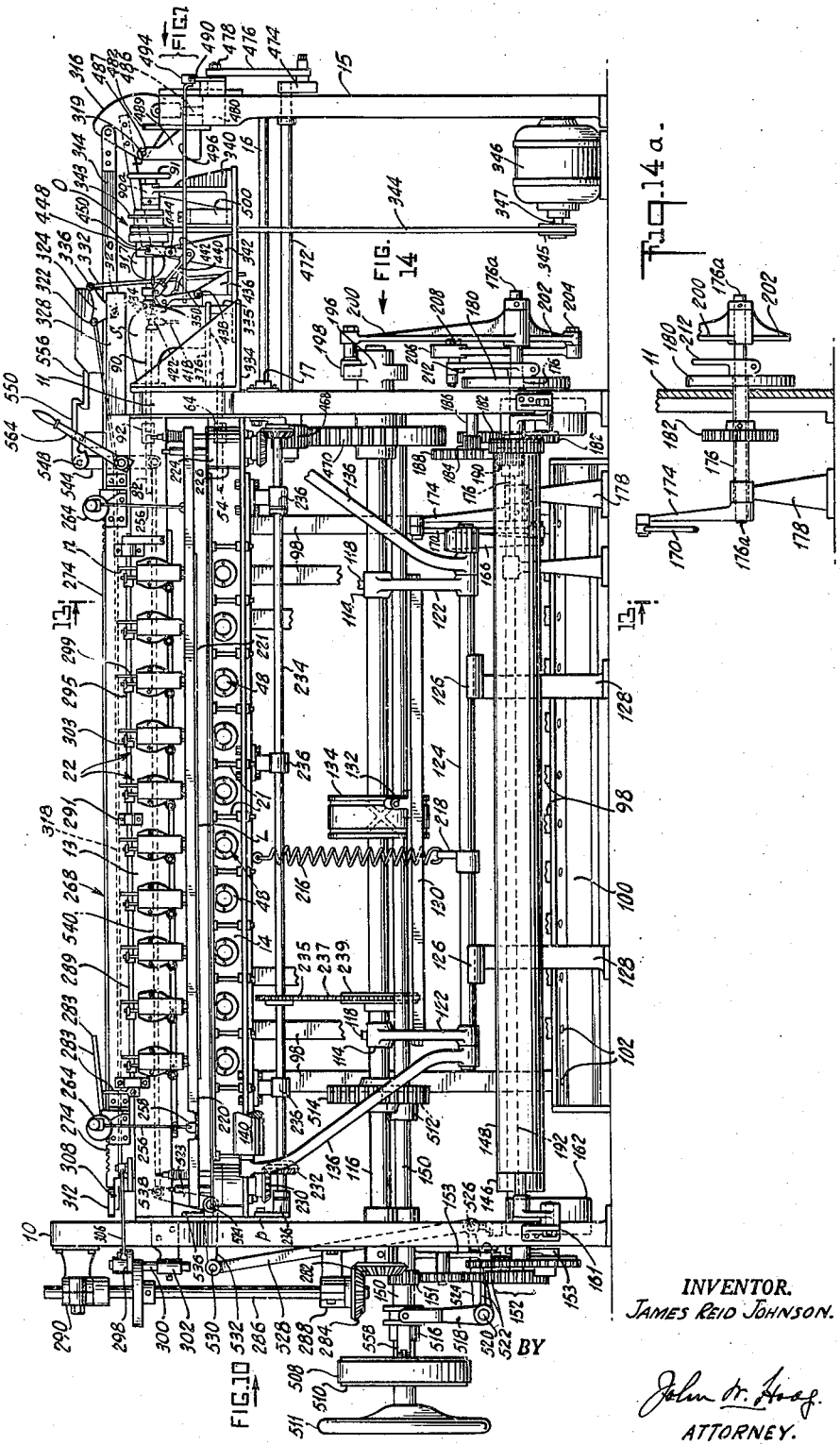
INVENTOR.
JAMES REID JOHNSON.
BY
John W. Hoag.
ATTORNEY.

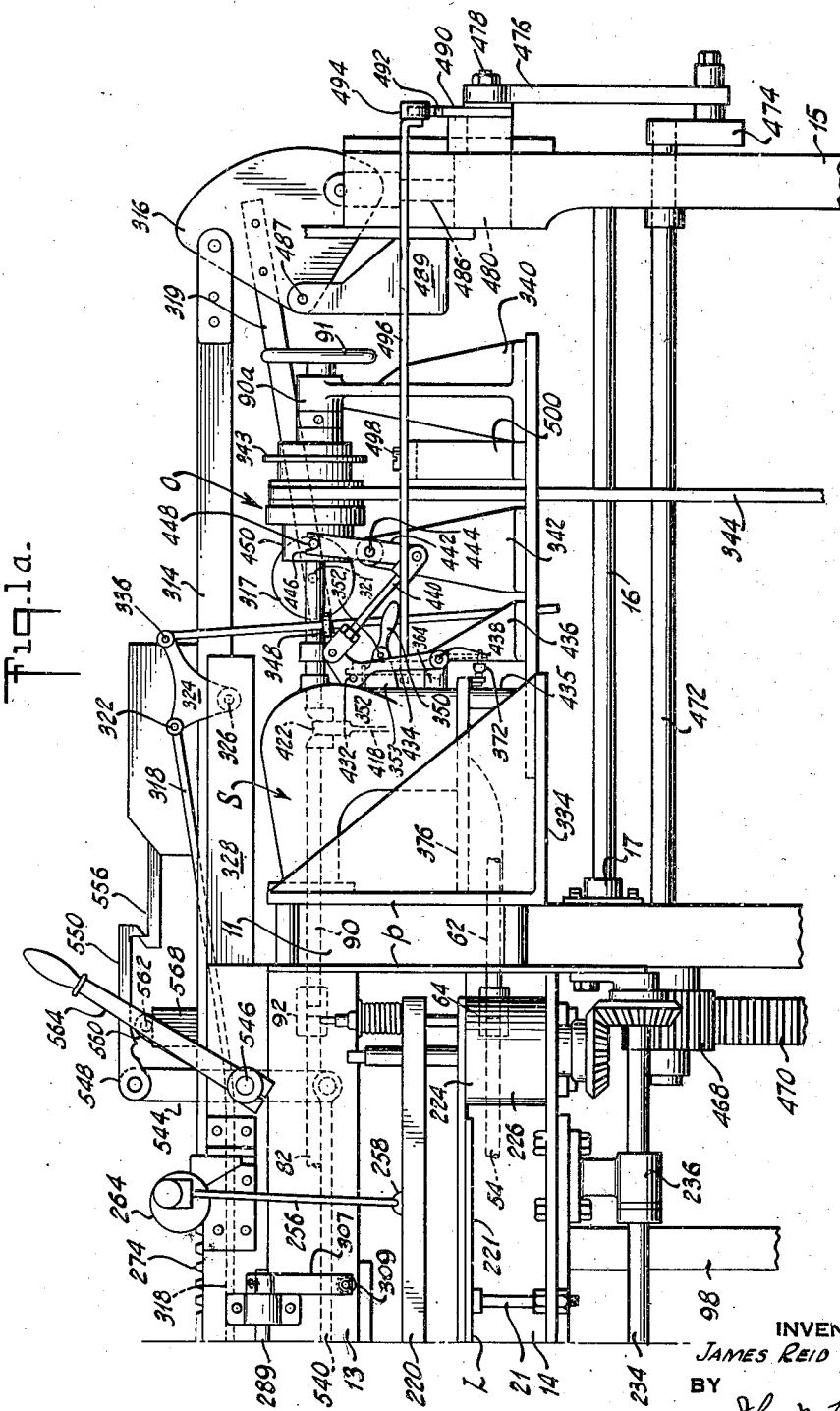

Oct. 4, 1949.  J. R. JOHNSON  2,483,466
QUILTING MACHINE
Filed Dec. 28, 1945  12 Sheets-Sheet 3
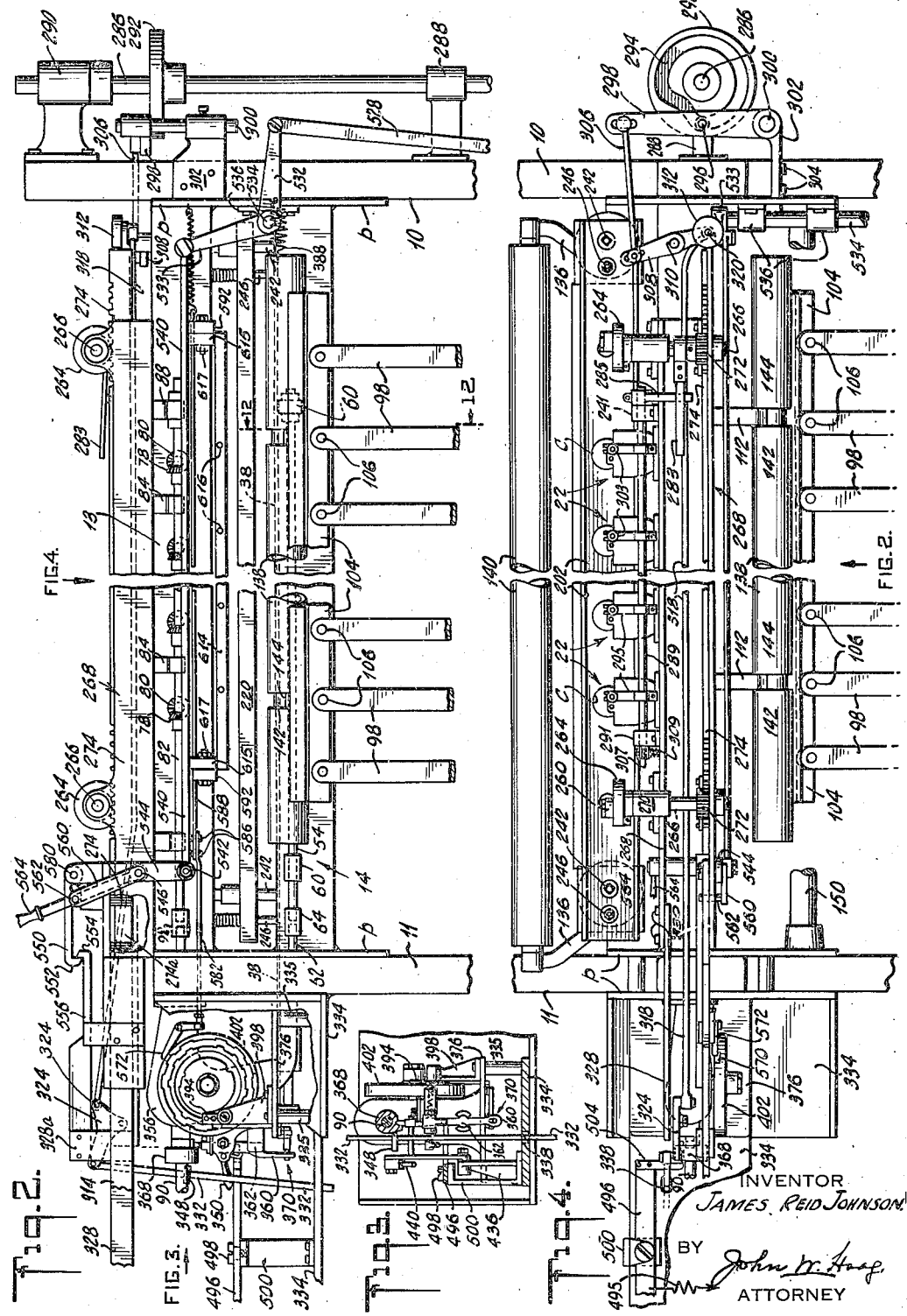
INVENTOR
JAMES REID JOHNSON
BY
John W. Hoag
ATTORNEY Oct. 4, 1949.  J. R. JOHNSON  2,483,466
QUILTING MACHINE
Filed Dec. 28, 1945  12 Sheets-Sheet 4
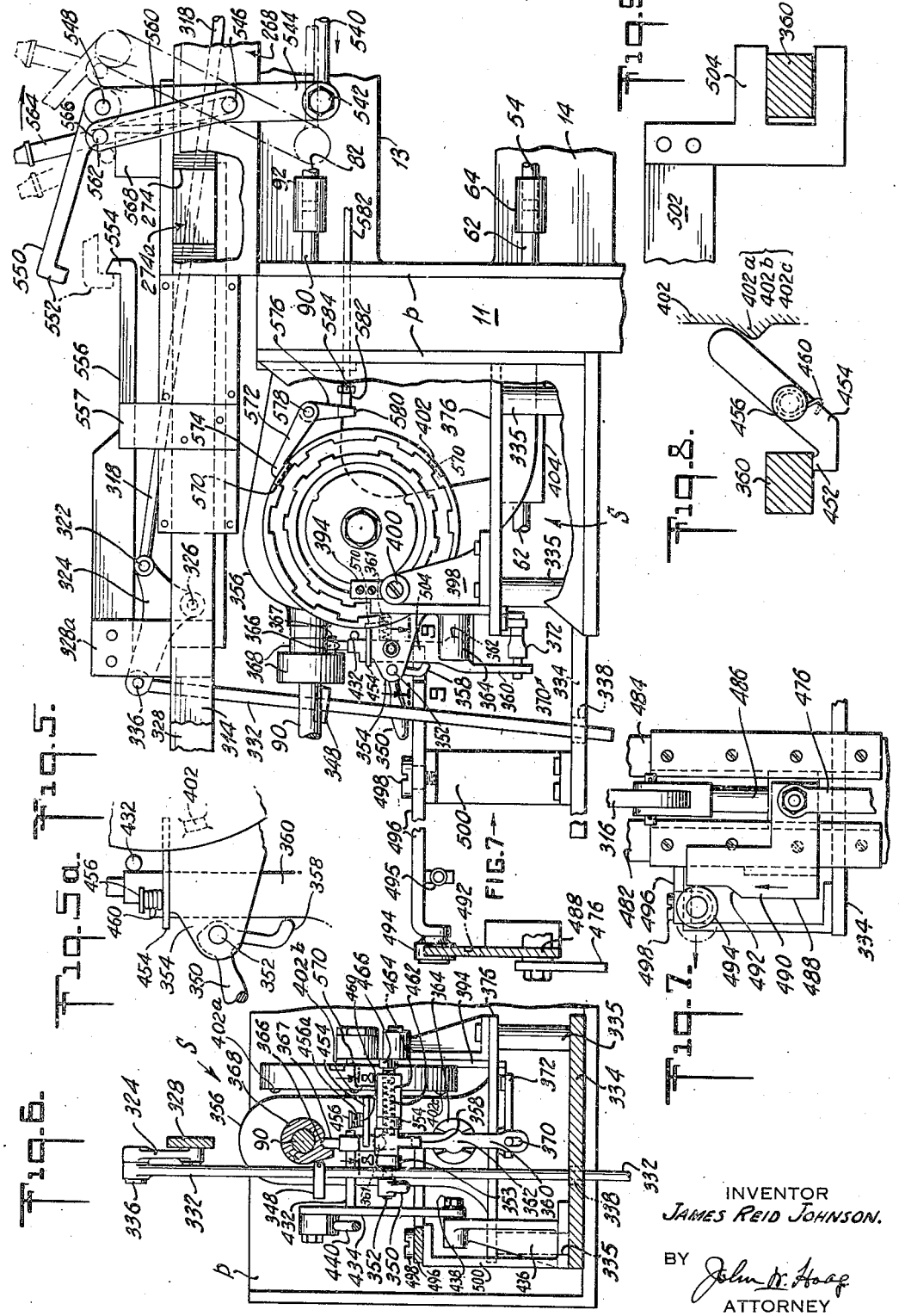
INVENTOR
JAMES REID JOHNSON.
BY John W. Hoag
ATTORNEY Oct. 4, 1949.
J. R. JOHNSON
2,483,466
QUILTING MACHINE
Filed Dec. 28, 1945
12 Sheets-Sheet 5
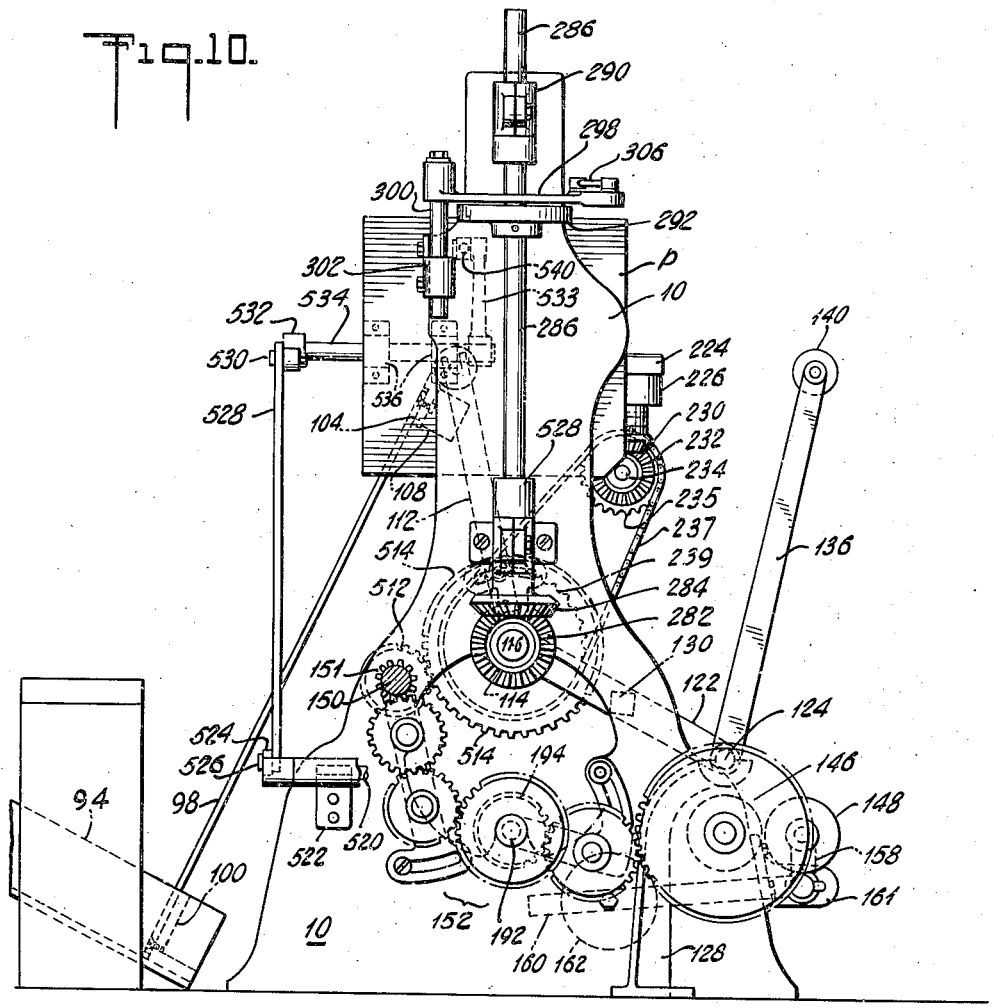
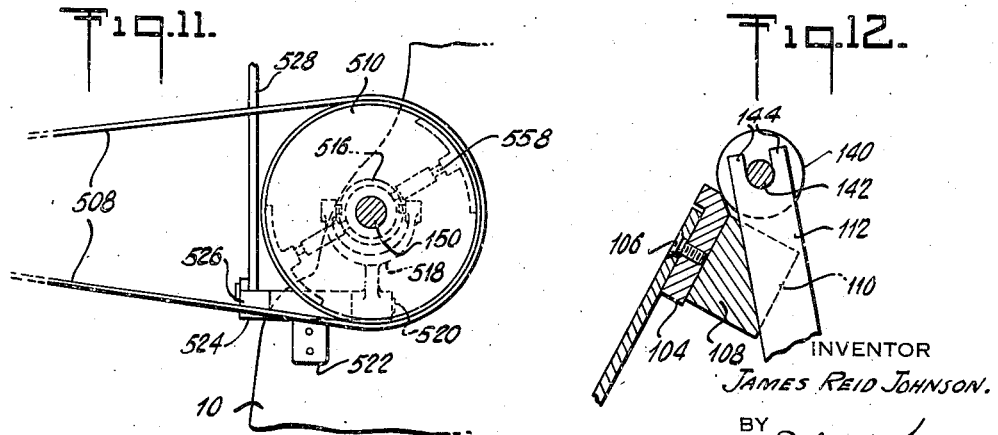
INVENTOR
JAMES REID JOHNSON.
BY
ATTORNEY Oct. 4, 1949.  J. R. JOHNSON  2,483,466
QUILTING MACHINE Filed Dec. 28, 1945  12 Sheets-Sheet 6

INVENTOR
JAMES REID JOHNSON.
BY
John M. Hoag
ATTORNEY

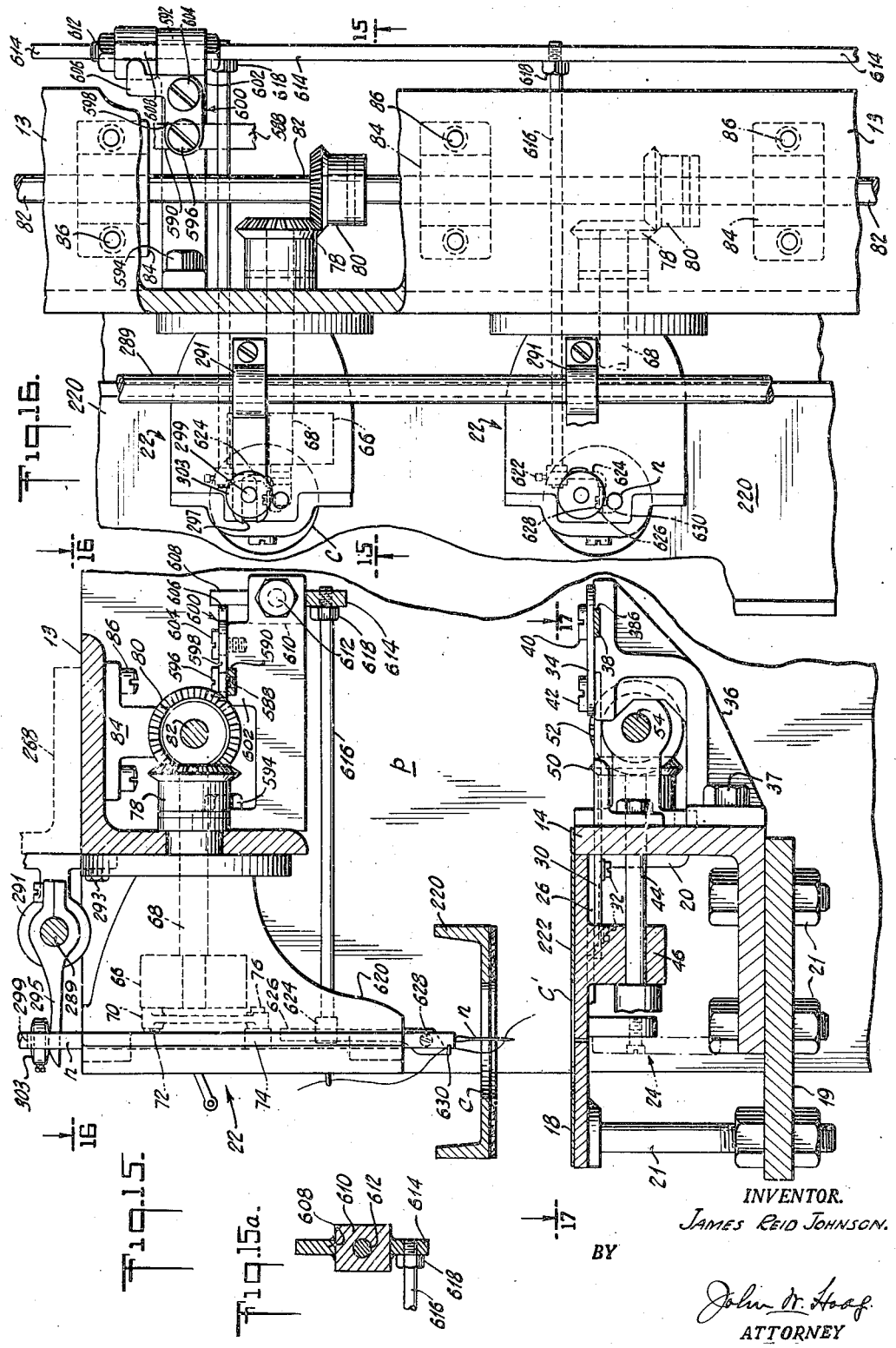

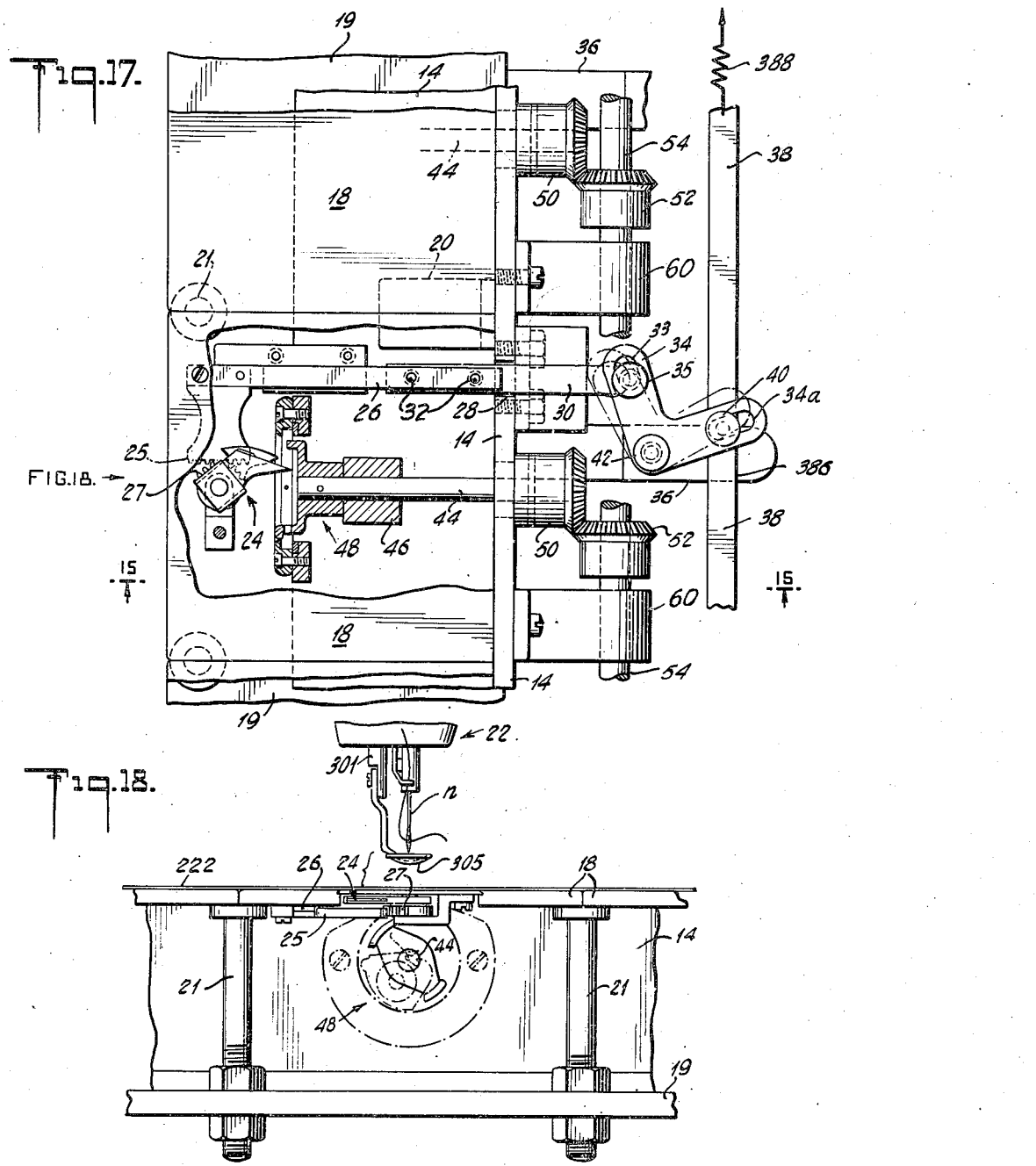

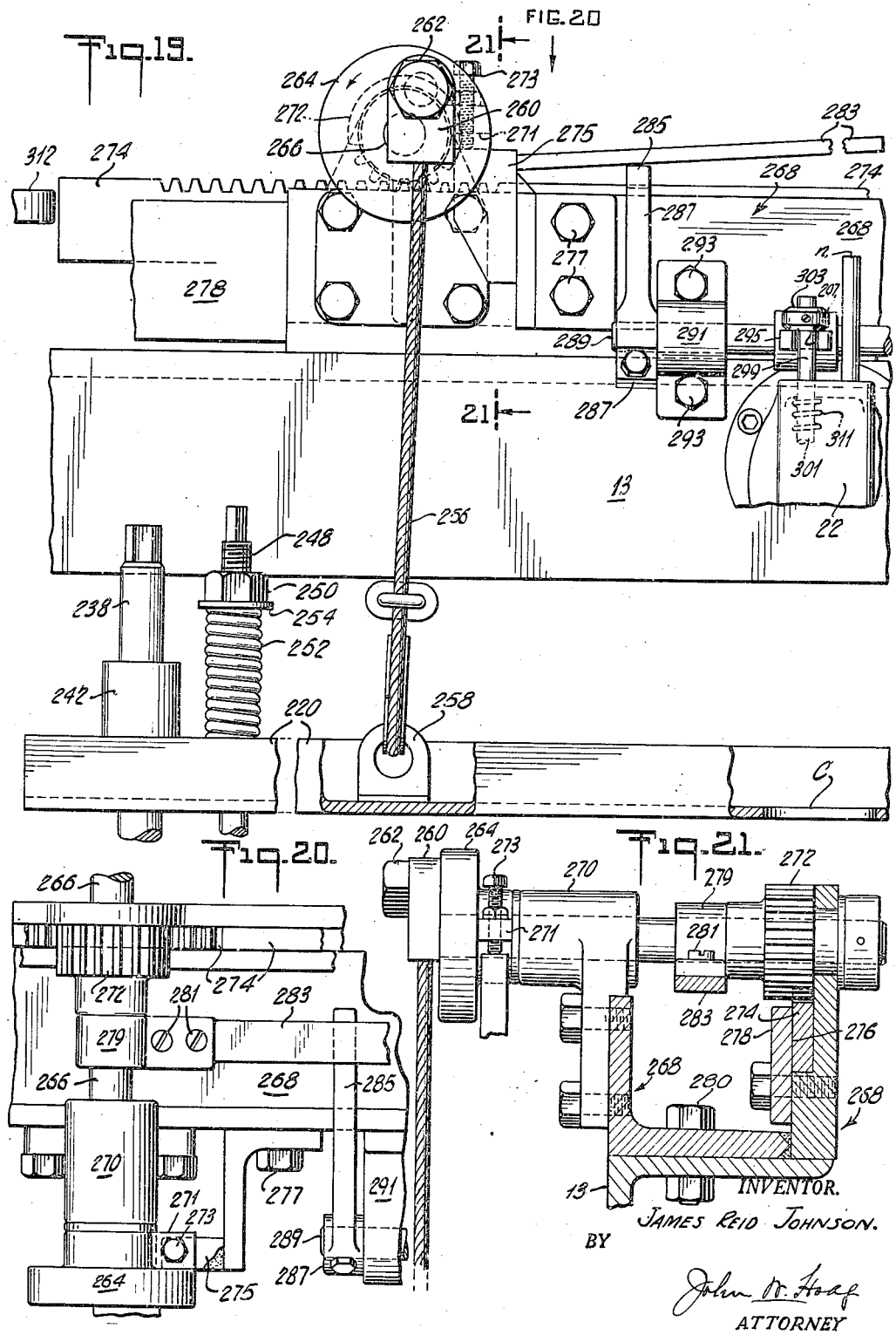

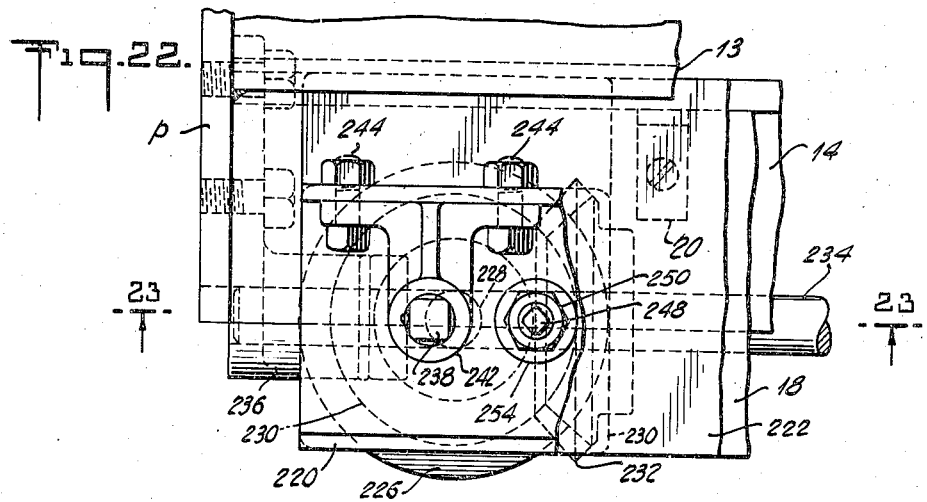
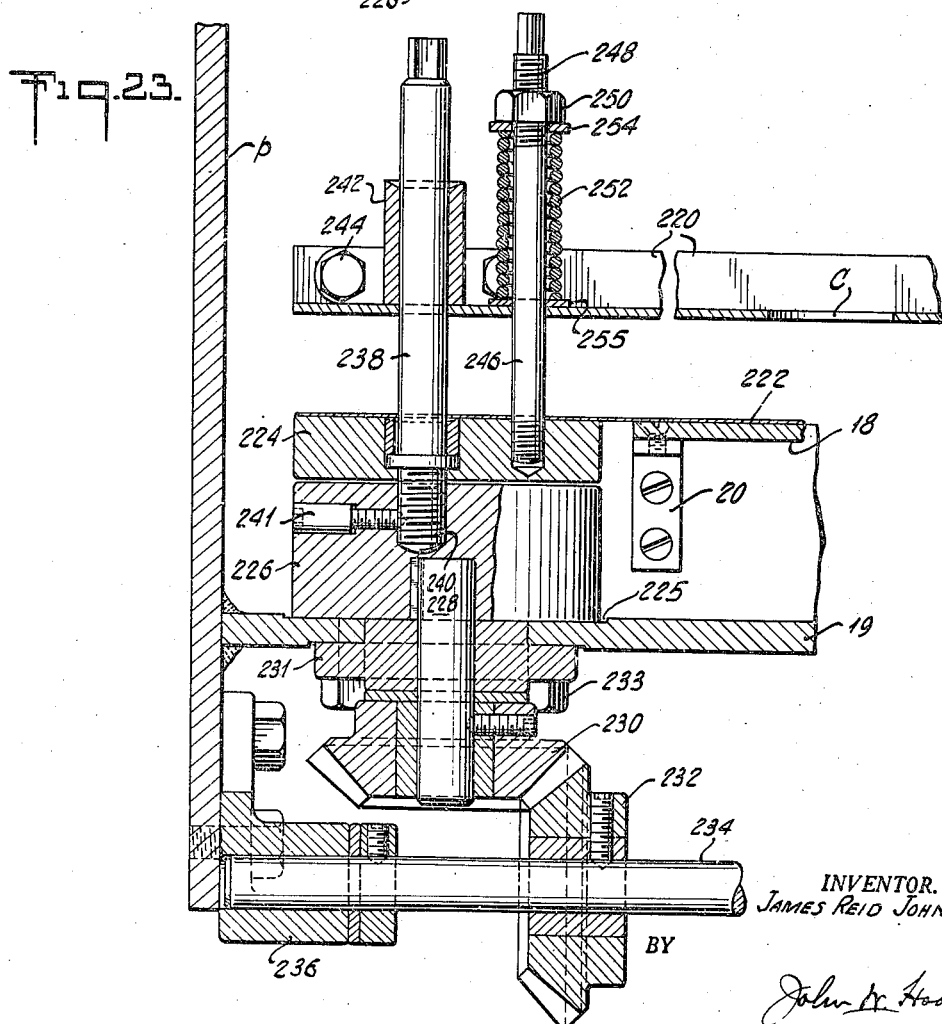

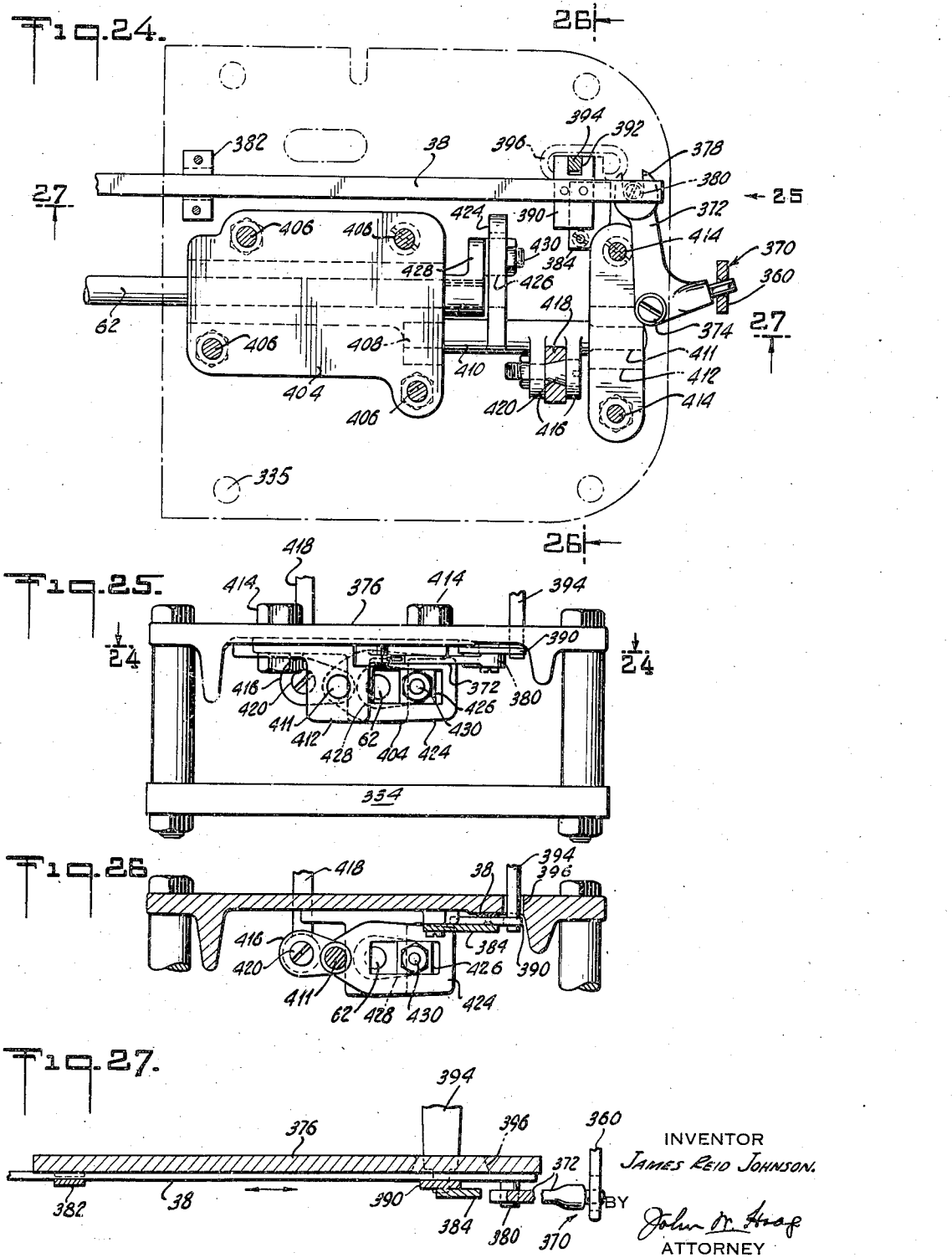

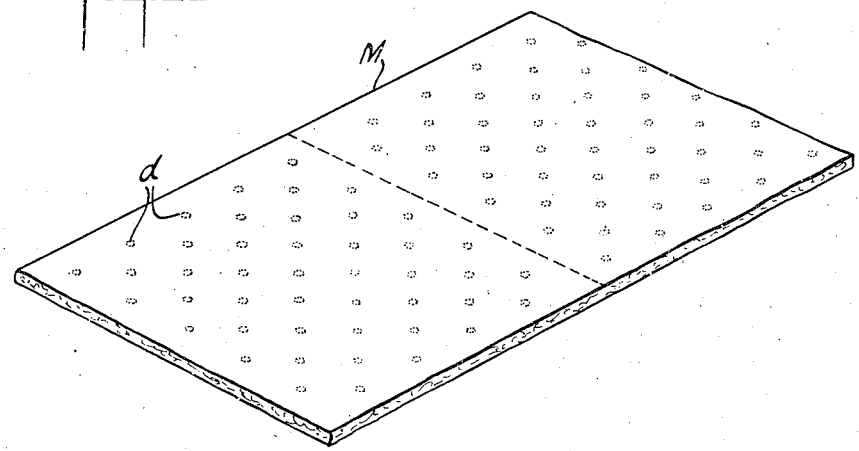
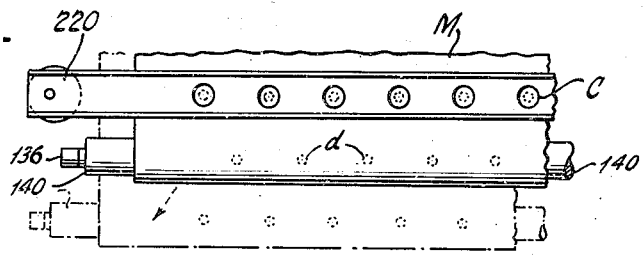
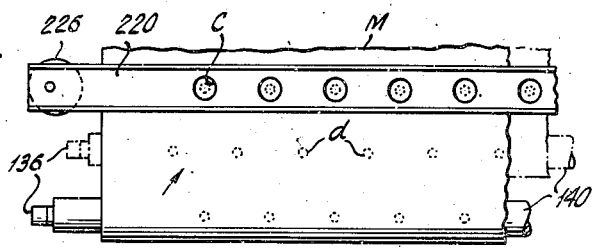
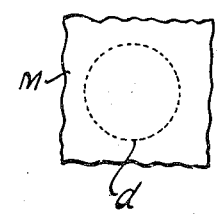
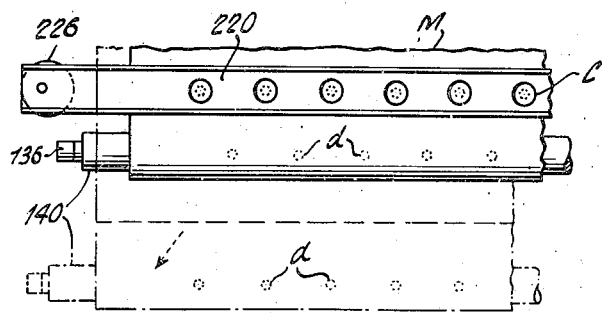

Patented Oct. 4, 1949

2,483,466

UNITED STATES PATENT OFFICE 2,483,466

QUILTING MACHINE

James Reid Johnson, New London, Conn.

Application December 28, 1945, Serial No. 637,598

7 Claims. (Cl. 112—117)

This invention relates to quilting comfortables and the like.

An object of the invention is to provide means for quilting a multi-ply strip by stitching together the plies simultaneously at a plurality of places by a plurality of disconnected lines of stitching.

Another object of the invention is to decorate a comfortable during the process of manufacture by simultaneously forming a number of spaced designs consisting of disconnected lines of stitching.

Another object of the invention is to quilt by means of a number of disconnected lines of stitching forming a number of independent, disconnected decorative objects, without the necessity of stitching each design separately.

Another object of the invention is to provide means for quilting a strip of material, which is to be cut into lengths to form comfortables and the like, by means of simultaneously formed, disconnected lines of stitching, forming rows of spaced, independent designs, the individual members of which may be staggered if desired.

Another object of the invention is to provide means for achieving the above stated objects while continuously advancing a strip of material.

Another object of the invention is to quilt a strip of material in a series of stitching operations by each of which a row of disconnected designs are formed simultaneously and to provide means for spacing the rows by a given distance, and periodically at intervals substantially corresponding to the length of the individual comfortables to be formed, by a distance greater than said given distance.

Another object of the invention is to provide apparatus adapted to quilt a strip of material from which comfortables or the like are being made while the strip is being advanced from means adapted to stitch together the edge portions of a plurality of superimposed fabrics forming the said strip to means for cutting the strip into desired lengths.

Another object of the invention is to decorate material from which comfortables or the like are to be made, as part of a series of operations performed in sequence on a continuously moving strip.

Another object of the invention is to provide simple, practical and efficient apparatus of the kind described herein.

Another object of the invention is to provide improved method and means for quilting comfortables and the like.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a front elevation of the machine;

Figure 1ª is a front elevational view on an enlarged scale of the structure shown in the upper right hand portion of Figure 1;

Figure 2 is a rear elevation of the upper half of the machine breaking out the center section and looking at Figure 4, in the direction of arrow marked "FIG. 2";

Figure 3 is a fragmental end view looking in the direction of arrow FIG. 3 at the left side of Figure 2;

Figure 4 is a top plan view of the elements shown in Figure 2, looking in the direction of the arrow FIG. 4 of Figure 2;

Figure 5 is an enlarged fragment of a portion of the structure shown in Figure 2, showing more clearly driving means for the multiple needle and cutter means;

Figure 13:
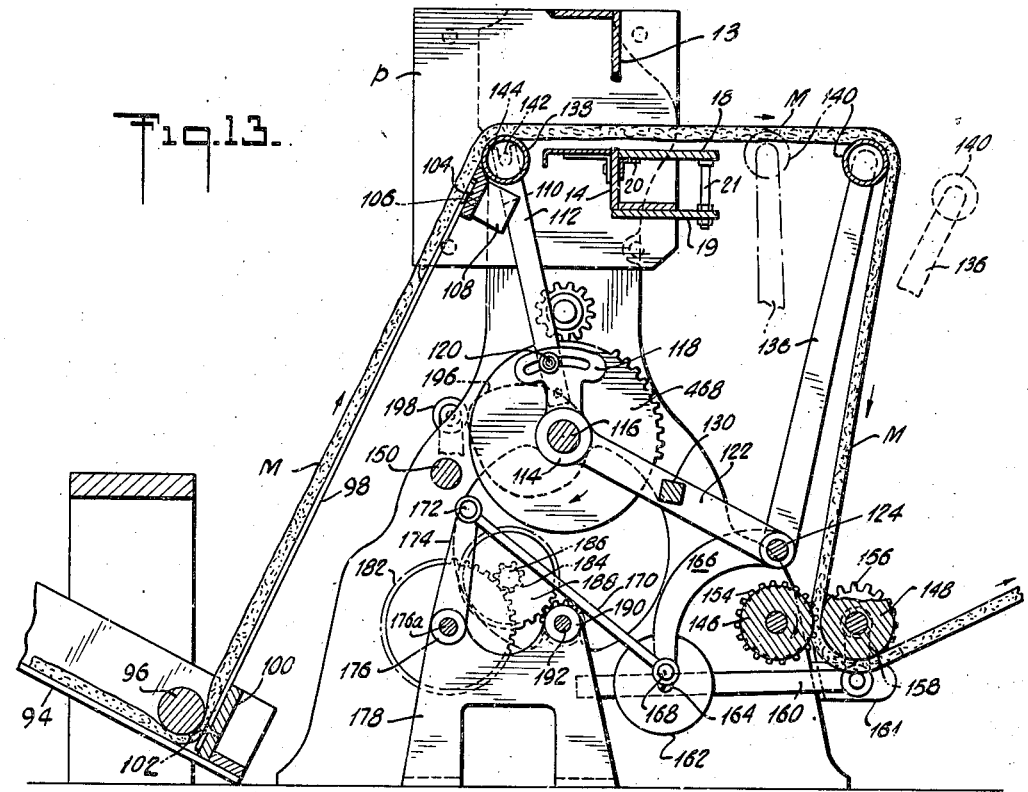
Figure 14:
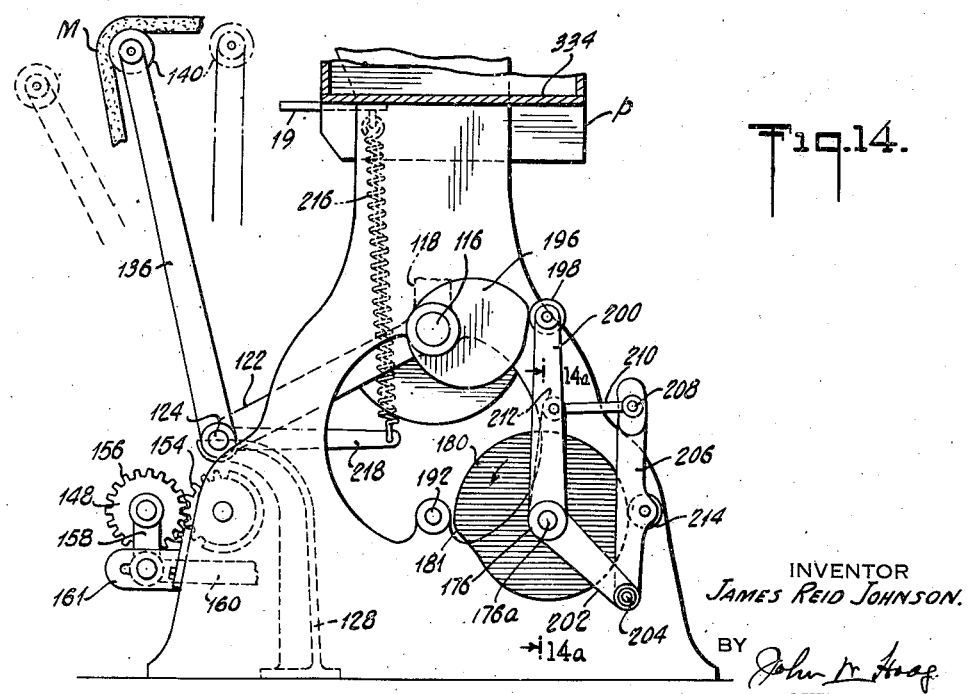

Figure 5ª is an enlarged fragmental view of a portion of Figure 5 showing the relationship between latch 454 and other structure with which it cooperates;

Figure 6 is a similar view to Figure 3 on an enlarged scale;

Figure 7 is a fragmental end view, looking at Figure 1 in the direction of the arrow marked "FIG. 7";

Figure 8 is an enlarged sectional detail taken on the line 8—8 of Figure 6;

Figure 9 is an enlarged fragmental cross section taken on line 9—9 of Figure 5;

Figure 10 is an enlarged end view of Figure 1 looking from the left in the direction of arrow marked "FIG. 10";

Figure 11 is a fragmental end view looking in the same direction as Figure 10, showing the main belt drive;

Figure 12 is a fragmental cross section taken on the line 12—12 of Figure 2;

Figure 13 is an enlarged vertical cross section taken on the line 13—13 of Figure 1, certain parts being omitted;

Figure 14 is an enlarged fragmental end view looking at the right hand side of the machine in the direction of arrow marked "FIG. 14" in Figure 1;

Figure 14a is a vertical section taken on the line 14a—14a of Figure 14;

Figure 15 is an enlarged cross section on the line 15—15 of Figure 16, showing the sewing head and bed plate arrangement;

Figure 15a is a detail sectional view taken through the pivot block 610;

Figure 16 is a fragmental top plan view of two of the sewing heads shown in Figure 15;

Figure 17 is a fragmental top plan view, parts being broken away, showing the thread cutting arrangement;

Figure 18 is a side view of Figure 17 looking in the direction of arrow marked "FIG. 18";

Figure 19 is a fragmental view of the clamp mechanism;

Figure 20 is a fragmental top plan view of Figure 19;

Figure 21 is a vertical cross section taken on the line 21—21 of Figure 19;

Figure 22 is a fragmental top plan view of the structure shown in Figure 23, showing eccentric means for imparting motion to material M;

Figure 23 is a cross section taken on the line 23—23 of Figure 22;

Figure 24 is a top plan view of the operating end of the bobbin shaft and cutter bar mechanism taken along the line 24—24 of Figure 25;

Figure 25 is an end view of Figure 24 looking from the right in the direction of the arrow marked "25";

Figure 26 is a cross section taken on the line 26—26 of Figure 24;

Figure 27 is a cross section taken along the line 27—27 of Figure 24;

Figure 28 is a perspective view of a portion or the rear end of a comfortable and the forward end of a second comfortable showing the severing line;

Figure 29 is a diagrammatic view showing the forward and sidewise movement of the pull roller;

Figure 30 is a similar view to Figure 29 showing the return motion of the pull roller;

Figure 31 is a similar view to Figure 29 showing the same motion with the extra long throw; and Figure 32 is a fragmental plan view of a ring of stitching at actual scale.

The embodiment of the invention described herein comprises vertical frame members 10, 11, and 15, spaced apart laterally, the members 10 and 11 serving to support and being interconnected by the angle members 13 and 14, and the plate member 19 which is supported from the horizontal angle of member 14, being bolted thereto by bolts 14a. The angle members 13 and 14 are welded to plates p which are bolted on the inside of the vertically extending frame members 10 and 11. Frame member 15, which is to the right of frame member 11 as viewed in Figure 1, is interconnected with frame member 11 by the cross member or tie-rod 16. Frame member 11 has the bracket 17 to receive an end of tie rod 16.

Between vertical support members 10 and 11 there is provided a bed plate 18 (see Figures 13 and 23) which is supported on angle brackets 20 extending forwardly from the vertically extending flange of angle member 14, and by the posts 21 which extend upwardly from plate member 19. Extending over and slideable upon bed plate 18 is a thin plate 222 and positioned above the bed plate 18 is a clamping head 220 which in the operation of the machine is intermittently lowered onto a continuous strip of material M to engage the strip between itself and said plate 222, the clamp and plate with the strip engaged between them then being moved relatively to multiple stitching means to cause the latter when intermittently actuated to sew and ornament the strip of material with a number of discontinuous lines of stitching each defining a desired pattern or design.

The strip of material M is pulled through the machine by the action of draw rollers 146 and 148, see Figure 13, and is advanced intermittently by a strip supporting assembly including rollers 138 and 140 supported on arms which project radially from hub 114 pivotally and slideably mounted on cross shaft 116, which assembly is both rocked on shaft 116 and reciprocated laterally on shaft 116, by cam means to be described, to advance the strip step by step over the bed plate 18 and to cause the stitched designs to be formed in staggered rows longitudinally of the strip.

In operative relation to the path of travel of the strip M there are provided a number of stitching means and bobbin means, indicated diagrammatically in Figure 1 as 22 and 48 respectively since they are of known construction, and between vertical supports 11 and 15 means are provided for controlling the multiple stitching heads for operation in unison, and this means may include known means for driving and timing the intermittent stitching operations. The drive and timing of the sewing heads is synchronous with the drive for intermittently advancing the strip M and moving it laterally, and for engaging the strip between the clamp 220 and the plate 222 and moving it relative to the stitching means to cause the several independent lines of stitching thus formed to describe the desired designs, and means are provided for safe-guarding the strip M from damage by the needles of the multiple sewing means during the forward movements of the strip, and other means are provided, operative when it is desired to stop the machine, to insure cessation of operation at a given point in the cycle of operation when the needles of the stitching machines will be disengaged from the strip M, all as will be more fully described.

The continuous material M, from which, in the embodiment of the invention illustrated herein, comfortables are formed comprising two face pieces of cloth with a filling or batt inbetween, may be supplied from a machine such for example as is described in Patent No. 2,281,308, where the edge of the face pieces are sewed together and a filling inserted forming a multi ply continuous strip. The strip M is preferably accumulated in folds in a "reservoir," not shown, in advance of the apparatus disclosed herein so that the operation described herein may be continuous regardless of the speed or continuity of preceding operations. From said "reservoir" the material is passed down an inclined stationary frame work 94, under guide means such as a float roller 96, and then upwardly over inclined support means, which as illustrated (Figure 13) comprises a number of substantially parallel slats 98, each of which is pivoted at its lower end, by means of pivot screws 102, respectively, to a cross member 100, which may rest on the lower end of stationary frame member 94. The slats 98 are pivotally attached at their upper ends respectively to the cross member 104 by means of pivot screws 106. Cross bar 104 has, on its inner surface, blocks 108, each provided with a vertically extending slot 110, in which respectively are received the arms 112 intermediate their ends. Arms 112 support roller 138, the axle 142 of which is supported in the bifurcated ends 144 of arms 112 (Fig. 13), and strip M, after passing up the inclined support 98 and over roller 138 is led over bed plate 18, above and below which sewing means are operatively positioned, and then passes over roller 140 supported on arms 136, and downwardly between draw rollers 146 and 148, after which the strip may be led to other apparatus such for example as cutting means for dividing it into desired lengths. Arms 112, together with arms 136 and their interconnecting means, to be described, comprise longitudinally and laterally reciprocable support means for material M.

This support means comprises two hubs 114 (see Figures 1 and 13) slideably supported on the horizontally extending shaft 116, which extends between, and is journalled in, frame members 10 and 11 and is driven from the main drive shaft 150 through gears 512, 514. From the hubs 114 respectively radiate the short slotted arms 118, respectively. Each arm 118 has a transversely extending slot 118a (see Fig. 13), and the lower ends of said arms 112 are adjustably secured to the arms 118 respectively as by means of the adjusting bolts 120 extending through the lower ends of arms 112 and through said slots. Also radiating from the hubs 114 are the arms 122, which, as shown, are angularly related to the arms 118, and at their other ends are fixed to a horizontally extending shaft 124 which is supported in the half bearing 126 provided at the top of support members 128 extending upwardly from the floor. The arms 122 are interconnected by the cross bar 130 which supports a cam follower 132 which engages in the cross-over cam 134, which is mounted on shaft 116 and initiates and determines the extent of the lateral reciprocating motion of the strip supporting means. Also fixedly mounted on shaft 124 are the upwardly projecting arms 136, which as illustrated are inclined or flared outwardly and upwardly, and serve to support a roller 140, similar to the roller 138.

As stated above, the material M, after passing up the inclined support 98, passes over rollers 138 and 140, which are positioned respectively behind and in front of the machine frame and bed plate 18, and then passes downwardly and is threaded between the draw rollers 146 and 148 by which it is advanced. As illustrated, roller 146 is positively driven from the main drive shaft 150, by gear 151 on drive shaft 150 and a chain of gears collectively indicated by the numeral 152. Gears comprising the chain of gears 152 are mounted on arms 153, mounted on frame member 10 and slotted for adjustment, making it possible to change the speed ratio if desired. The rollers 146 and 148 are provided respectively with intermeshing gears 154 and 156 by which the drive from roller 146 is transmitted to roller 148. It should be noted that the gear teeth of each of the gears 154 and 156 are cut especially deep to allow for variations in the thickness of the material M passing between them. The roller 148 is tensioned against the strip of material M, to insure positive drive of the strip of material by frictional engagement between rollers 146 and 148. As shown in Figure 13, roller 148 has mounted on each end a depending lever 158 to which is rigidly connected a weight bar 160 pivotally mounted in brackets 161 bolted to side frames 10 and 11 respectively, having thereon weights 162 adjustable by means of screws 164.

Mounted on horizontal shaft 124, at its extreme right end as viewed in Figure 1, is the upper end of an arcuate arm 166, which in effect forms a bell crank lever with arms 136. The lower end of arcuate arm 166 is pivotally connected at 168 to one end of a connecting rod 170 the other end of which is pivotally connected at 172 to an arm 174. Arm 174 is keyed on one end of a shaft 176a which extends through and protrudes from both ends of, and is freely rotatable in, a hollow counter-shaft 176. (See Figure 14a.) On the other end of shaft 176a a lever 212 is keyed and a bell crank lever 200—202 is pivoted as will be described. Hollow counter-shaft 176 is supported by an upright bracket 178, on the left hand side of upright support 11 as viewed in Figure 1, extending upwardly from the floor. Hollow shaft 176 extends through the frame member 11 and has mounted thereon the cam 180, which is substantially a circle except at its high point 181, positioned to the right of upright support 11 as viewed in Figure 1. Cam 180 is driven by a gear 182 (Figure 13), which may also be seen in Figure 1 mounted on hollow shaft 176 just on the inside of upright 11.

Gear 182, is driven by a pinion 184, connected to gear 188, mounted on a stud shaft 186, supported from frame 11, and gear 188 meshes with gear 190 on shaft 192. Shaft 192 extends the length of the machine, and fixed to it, to the left of member 10 as viewed in Figure 1, is gear 194, comprised in the chain of gears 152 and which is accordingly driven from the gear 151 on the main drive shaft 150.

Shaft 176a being freely rotatable relatively to hollow shaft 176 is thus independent of the rotation of cam 180.

On the portion of shaft 116 which protrudes to the right of frame 11 as viewed in Figure 1, is cam 196 which serves, as will be described, to give a forward throw to arms 136, intermittently, to advance strip M intermittently over the bed plate 18. (See Figures 13 and 14.) This cam has a follower 198 mounted on the top of bell crank lever 200—202, which is free on the shaft 176a and pivots thereon, and the end of arm 202 is pivotally connected by pivot 204 to a cam follower lever 206. The upper end of lever 206 is pivotally connected, as at 208, to a lever or connecting link 210, which, in turn, is connected to lever 212 mounted on the shaft 176a. As stated above on the other end of shaft 176a is keyed lever 174 (Figure 13) and thus, as lever 212 (Figure 14), is moved clockwise, arm 136 will be moved counter-clockwise causing the strip M to feed forward. The bell crank lever 200—202 (Figure 14), pivots on the outer end of shaft 176a, but otherwise it is not connected to 176a, and therefore is not governed by any motion of 176a, nor is shaft 176a influenced directly by its bearing journal contact with bell crank 200—202. Lever 206 has thereon cam follower 214, which rides on cam 180 and through which, together with the means described above, at intervals during the travel of the strip M equivalent to the desired length of a comfortable or a quilt, an additional throw is given to the lever 136 at the end of each quilt length so that when the strip is cut into lengths the adjacent ends of successive lengths will each have an unquilted end margin. Roller 214 is the fulcrum for the lever motions of bell crank 200—202 and levers 212 and 174, and each time the high point on cam 196 strikes cam follower 198 bell crank lever 200—202 acting through lever 206, link 210 and lever 212 rotates shaft 176 causing a forward throw of arm 136, through lever 174, link 170, and arcuate arm 166. When to the constant action of cam 196 through bell crank 200—202 is added the action of cam 180 pushing fulcrum roller 214 to the right (Figure 14) an increased throw is obtained. In the device illustrated herein cam 180 is related to cam 196 so that it has one revolution for each fourteen revolutions of cam 196, and on each fourteenth revolution of cam 196 strip M is advanced a double distance, thus providing a double space between rows of quilting designs. When the strip is divided the division may be made along the transverse median line of this space thus providing an end margin for each comfortable substantially corresponding with the spacing between rows of quilt designs.

Strip M passing over roller 140 on the upper end of arms 136 tends to rotate arms 136 inwardly. This tendency is counter-balanced by a spring 216 which, at its upper end is secured to the bottom of plate 19 and at its lower end is secured to the free end of a lever 218 which is fixed on shaft 124. The lever 218 coacts with the arms 136 to form a bell crank-like structure through which the effect of the pull of the material M is counter-balanced, and roller 140 is thereby urged against strip M insuring frictional engagement of the strip with roller 140 during its lateral movements.

During the operation of the machine the continuous strip of material M is steadily advanced due to its frictional engagement between rollers 146 and 148. This is made possible, even during the intermittent periods when the quilting operation takes place and during which a portion of the continuous strip M is held stationary by clamp means to be described, because of the reciprocation of lever 136 in the plane of travel of strip M which, when it is moved back by the tension of the strip during the intermittent periods when the position of cam 196 permits rearward movement of lever 136, moves back along the strip, thus leaving more of the strip between it and the draw rollers 146 and 148. It thus will be understood that when lever 136 moves rearwardly, as from its position shown in full lines to its position shown in dotted lines in Figure 13, the material in advance of roller 140 continues to be drawn between rollers 146 and 148, thus taking up slack in the strip which would otherwise be created as lever 136 moves rearwardly. During this rearward movement of lever 136 the strip of material M is clamped down on the bed plate 18 of the machine to facilitate the multiple stitching operation by which the multiple quilting designs d (Figures 28–31) are formed. As will be more fully described a number of these designs d are formed simultaneously at spaced intervals laterally of the strip, and means are provided so that the succeeding designs stitched by each needle are staggered in relation to one another. This is accomplished by lateral reciprocating motion of the strip supporting assembly, which is described above and includes arms 112 and roller 138, arms 136, and roller 140, and the interconnecting angularly related members, short arms 118 and arms 122, both radiating from hub 114 which is slideably mounted on shaft 116, the assembly being actuated for lateral movement by cross-over cam 134. The lateral reciprocating stroke may be controlled as desired for the ornamentation of the strip M, according to the throw of the cross-over cam employed (the throw of the apparatus described herein is alternately three inches in one lateral direction and then three inches in the other lateral direction on the next stroke). While cams 134 and 180 may be set independently of each other if desired, in the apparatus described herein the sidewise reciprocating stroke occurs simultaneously with the forward stroke of lever 136 by which the portion of the material M to the rear of roller 138 is advanced intermittently, the material being moved sidewise in one lateral direction with one forward stroke of lever 136 and then being moved laterally in the other direction with the next forward stroke of lever 136. Due to the engagement between the lever 112 and the slotted blocks 108 the cross bar 104, together with the upper ends of slats 198, are reciprocated together with the arms 112 and 136 and their interconnecting means.

As best seen in Figures 1, 19, 20, 21, 22 and 23, a clamping head 220, which as illustrated herein is a U-shaped or cross channel member, is provided above bed plate 18 and is dropped onto the material between its forward movements to engage the material M during stitching of the quilting designs d. Clamping head 220 is movable, in unison with thin plate 222, which as stated above extends over and is slideable on bed plate 18, to move the material M relatively to the bed plate 18 during the stitching operation to define the desired design of the several lines of stitching. In the embodiment of the invention as described herein clamping head 220 and thin plate 222 are moved to give the portion of strip M which is clamped between them a more or less circular motion. Clamping head 220 has on its under surface a friction strip of leather or the like, 221, mounted in any suitable way. Thin plate 222 has a highly polished under surface to facilitate movement of plate 222 on, and relative to, bed plate 18. Plate 222 is fastened, preferably by welding, on blocks 224, which are spaced on either side of the sewing heads and supported upon drums 226 which are driven by vertically extending shafts 228 having at their lower ends respectively bevel gears 230 which in turn are driven by bevel gears 232, respectively, on cross shaft 234. Bevel gears 230 are mounted in bearings 231 bolted to the under side of plate 19 by bolts 233. Shaft 234 extends laterally the length of the machine and is mounted in bearings 236 bolted to the plates p on the inside of frame members 10 and 11. Mounted on shaft 234 is a sprocket gear 235 (see Figure 1) driven by a chain 237 from sprocket gear 239 which is mounted on shaft 116, which in turn is driven from main drive shaft 150 through gears 512 and 514.

Each drum 226 has mounted in it guide pins 238 with their lower ends threaded at 240 to be received in the drum 226 and held in place by binding screws 241. As will be seen from Figure 23 the relation of guide pins 238 to the upwardly extending shafts 228, respectively, is eccentric. The upper portion of each guide pin 238 is received in a boss or guide member 242 which is bolted to the clamping head member 220 by means of bolts 244 (Figure 23). Studs 246 threadedly engaged in blocks 224 rise vertically through the clamping head 220 and have threads 248 on their upper extremity on which the adjusting nuts 250 respectively are adapted to be screwed to adjust tension on a spring 252 which is compressed between washer 254, provided below nut 250, and washer 255 positioned on the horizontally extending portion of clamping head 220. It will be noted that as illustrated in Figure 23 the upper face of plate 19 is slightly recessed at 225 to provide working surfaces for the drums 226. It will be understood that the drive for rotating drums 226 is transmitted from shaft 234, bevel gears 232 and 230, and vertical shafts 228. The rotary motion of drums 226 will in turn be transmitted to blocks 224 and plate 222 and to clamping head 220, which will then have been dropped onto the strip M, simultaneously and to the same degree, by the guide pins 238, which, as mentioned, are eccentrically supported by blocks 226. The extent of the circular movement thus given intermittently to members 220 and 222, between which strip M is clamped for the stitching operation, depends upon the degree of eccentricity given guide pins 238, which will of course be governed by the size of the design which the needles individually are to stitch.

The horizontally extending portion of channel clamp member 220 and the plate 222 which moves with blocks 224 are each cut out at spaced, vertically aligned intervals, at c and c' (Figure 15) respectively to provide clearance for the respective needles n during the circular movement of the said plate 222, and clamping member 220, and the bed plate 18 is similarly provided with apertures for reciprocation of the needles n.

Clamp member 220 is raised and suspended, see Figures 19–21, by means of wire ropes 256, the lower ends of each of which are shackled to a protruding angle piece 258 welded to the horizontal portion of clamping head 220, and the upper ends of which are fastened to pivotally mounted blocks 260 which in turn are pivotally mounted at 262 on disks 264. Disks 264 are supported on horizontal shafts 266, mounted on a channel-like support 268, which extends laterally across the machine from side to side, by means of bracket bearings 270, and protruding from the hubs of disks 264 are lugs 271 adapted to receive adjusting screws 273 which provide the split second timing of the downward movement of the clamping head 220. Stops 275 are provided and are bolted at 277 to the vertical leg of channel-like member 268. On the rear end of shafts 266 respectively are pinions 272 adapted to engage a reciprocating rack bar 274 the movements of which raise and drop clamp member 220. The rack bar 274 is slidably supported in a slideway 276 provided in the rear wall of the channel-like support 268 which is supported on the top of angle 13 by means of bolts 280. A plate 278 is bolted to the lower and thickened portion of the said rear wall to provide a keeper for reciprocating rack bar 274.

The rack bar 274 is actuated by shaft 116, which is driven from the main drive shaft 150, through gear 282 on shaft 116, gear 284 on vertical shaft 286, which is supported by a pair of bearing brackets 288 and 290 from the frame member 10, the internal cam 292 (Fig. 2) which is mounted on the shaft 286 and has a cam slot 294 in which is received the cam follower 296, mounted on arm 298, and pivoted at 300 on a bracket 302 bolted to frame member 10 by bolts 304. The upper end of the arm 298 is pivotally connected by link 306 to a lever 308, which is pivoted at 310 to the horizontal face of angle support member 13, and at its other end has a roller 312 which is aligned with the end of the rack bar 274 (Figures 1 and 4) and serves to initiate the movement of the rack bar to the right as viewed in Figure 1, which movement drops the clamp 220 into engagement with the strip M for a quilt design stitching operation.

The movement of the rack initiated by the roller 312 starts the rotation of pinions 272 and rotates them sufficiently to move the blocks 260, which are initially off center, to a position permitting the clamping head 220 to fall by gravity, and this action in turn, through the engagement of pinions 264 with rack 274, completes the movement of the rack toward the right as seen in Figure 1. At the extreme end of its movement the rack bar moves into abutting position relative to a sliding bar 314 which at its other end is attached to a pivoted bell crank plate 316, the action of which will be described, and which serves, when actuated by piston 480, to move bar 314 to return the rack bar 274 to elevate clamp member 220 at the end of each stitching operation. After resetting clamp 220 bar 314 moves back, to the right as viewed in Figure 1, to leave a space 274$^a$ (Fig. 5), between its end and the adjacent end of the rack bar, required for the movement of the rack bar toward bar 314 when it is moved by the falling of clamp member 220 at the beginning of each stitching operation.

The movement of the lever 308 causing movement of the rack 274 to initiate the fall of clamp member 220 also serves to control the clutch O through the rod 318 which is pivoted at 320 to lever 308 (see Figures 2 to 5). The other end of rod 318 is pivoted at 322 to a bell crank lever 324 which is pivotally mounted at 326 to a bar 328, which is mounted by bolts 330 (Fig. 4) to a vertical face of the channel-like member 268. Bell crank lever 324 serves to actuate the stitching mechanism through rod 332 as will be described.

Supported from the downwardly projecting portion of angle member 13 are a number of sewing heads 22 which may be of conventional form, the needles n of which respectively are reciprocable in a vertical plane. Supported from the vertically extending portion of angle member 14 are a number of thread cutting means 24 (see Figs. 15 and 17), similar in number to the sewing machine heads 22, which may be of well known construction and, accordingly, are not described in detail herein. Bed plate 18, and also the plate 222 which overlies the bed plate 18, and is movable thereon as has been described, are cut out at spaced intervals to permit the needles n to travel below the level of the bed plate and thus to move into position to coact with the thread cutting means 24 which are motivated respectively by a pinion 27 travelling on rack 25 which is mounted on a bar 26, an extension 30 of which is fastened to bar 26, as by screws 32, and passes through the slot 28 provided in the vertical member of angle 14.

The extension 30 is connected to a bell crank 34 by shoulder screw 35, received in the slot 33 in one arm of the bell crank which is pivotally mounted on bracket 36 by shoulder screw 42. The other arm of the bell crank 34 is slotted at 34$^a$ and is connected to a bar 38 by means of shoulder screw 40. Bracket 36 is mounted on the vertical wall of angle support member 14 by bolts 37. The bar 38 which actuates the thread cutting means 24, extends the length of the sewing heads, which as illustrated herein are ten in number, and is operated from the body of the sewing machine by means to be described later. Supported from the upright member of angle 14 is a shaft 44 mounted in the bearing 46 which depends from the bed plate 18 and operates the bobbin mechanism 48 (Figures 17 and 18), which may be of well known kind and accordingly is not described in detail herein. On the rear of the upright member of angle member 14 and fastened to shaft 44 is a bevel gear 50 which meshes with a bevel gear 52 mounted on a shaft 54 which in turn is mounted in suitable bearings 60 (Fig. 17) mounted on cross angle member 14. Shaft 54 extends lengthwise of the machine and as best seen in Figure 2 is mounted in suitable bearings 60, and at its end adjacent to upright 11 it is coupled to a drive shaft 62 which may be the bobbin drive shaft of a conventional sewing machine, S, by means of a coupling 64.

The needles $n$ of the sewing machine heads 22 are each reciprocated in a vertical plane by cams 66 mounted on horizontally extending shafts 68 (see Figures 15 and 16), which are driven from a common drive shaft 82 as will be explained. Each of the cams 66 is attached to its respective needle $n$ by means of a connecting rod 70, mounted eccentrically on its cam 66 by a pivot 72 and secured at its other end to collar 74 fixed on the shaft of the needle $n$, by pivot 76. The shafts 68 are in turn each driven by means of a bevel gear 78 which is fixed on shaft 68, on the rear side of the vertically projecting member of angle 13 (Figure 15), which in turn is driven by bevel gear 80 mounted on needle drive shaft extension 82, which extends lengthwise of the machine, and is supported in the bearings 84 supported from the under face of the horizontally extending portion of angle 13, as by screws 86, and is mounted at its end which is to the right as viewed in Figure 2, in a bearing 88, and at its other extremity is connected by means of coupling 92 to needle drive shaft 90.

Projecting laterally from upright 11, and to the right as viewed in Figure 1, is a platform 334, which, as illustrated, comprises the horizontally extending portion of an angle bracket member, the vertical portion of which is secured in any suitable way to upright 11. Rod 332 is connected at its upper end, at pivot 336, to bell crank 324, and extends downwardly through the hole 338 in platform 334 which serves to receive and act as a guide for the free end of rod 332 (Figures 5 and 6). Mounted on the platform 334 is an upwardly extending bracket 340, supporting the driven end of needle drive shaft 90, and another bracket 342 which serves as a pivot for means to throw clutch O into and out of engagement.

The clutch O comprises a pulley 343 driven by belt 344 from pulley 345 which in the embodiment of the invention described herein is driven by a motor 346 mounted on the floor, through shaft 347. Motor 346, which drives the stitching mechanism is synchronized with the main drive for the machine.

Rod 332 is provided with a collar 348 (Figures 5 and 6) designed to engage, upon the downward motion of rod 332, with a projection 350 on a shaft 352 mounted in two lugs or projections 354 extending from the casing 356 of sewing head drive mechanism, which may be of well known kind and therefore is not described in detail herein but is indicated generally as S, in Figure 1. Mounted rigidly on the shaft 352, and positioned between the lugs 353 and 354, is a depending finger 358, which is designed to engage a vertical arm 360 which is pivoted in a ball and socket joint at 362 in a bifurcated projection 364 integral with the casing 356. The upper portion of vertical lever 360 has rigidly mounted in it a pin 366 which acts as a stop for a rotary cam member 368 mounted on needle drive shaft 90 by engaging a projection 367 on the cam needle. In the operation of the apparatus when finger 358 pushes on the part of the arm 360 above the pivot 362 thereby swinging the arm 360 and pin 366 in a clockwise direction as viewed in Figure 5, the rotary cam 368 is released from its engagement with pin 366 and needle drive shaft 90 is thus freed to start a cycle of the stitching mechanism.

Arm 360 also actuates thread cutting and bobbin means which may be of known kind such as are in part illustrated herein for convenience in Figures 24 to 27. The lower end of arm 360 is connected by a pin and slot connection 370 to a bell crank lever 372 pivoted by pivot 374 to the under side of the platform 376 which projects laterally from plate $p$ of upright 11, and is supported above platform 334 by posts 335. The other arm of bell crank 372 is forked at 378 to receive a roller 380 supported from the thread cutting means actuating bar 38, which is slideably mounted in brackets 382 and 384, shown in Figure 24, and slides in recesses 386 provided in brackets 36 (see Figure 15). At the right hand end of bar 38, as viewed in Figure 2, is a tension spring 388, best seen in Figure 17, and interconnected between the end of bar 38 and plate $p$ on the inner side of upright 10, and serving to return bar 38 to its initial position at the end of a stitching operation. Riveted to bar 38 at its other end, as best seen in Figure 24, is a plate 390 forked as at 392 to receive in it the end of a lever 394 (Figure 5), which extends vertically up through a slot 396 in platform 376. Lever 394 is pivoted by pivot 400 to a bracket 398 which in turn is mounted on the platform 376, and the top portion of the vertical arm 394 engages a timing cam 402 of any well known type, that shown being a three-stop cam of the kind conventionally used in some sewing machines, and adapted to make one-third of a revolution for each complete cycle of steps performed by the quilting machine described herein.

Also shown in Figure 24 is the bobbin shaft actuating means which consists of main bearing block 404, mounted to the under side of platform 376 by bolts 406, and adapted to receive the reduced end 408 of a rocker shaft 410, the other reduced end 411 of which is mounted in a bearing 412 secured on the under face of platform 376 by bolts 414. Projecting from rocker shaft 410 are two spaced ears 416 and pivotally supported between them on conical stud 420 is one end of the connecting rod 418 the other end of which is received in the crank or offset portion 422 of needle drive shaft 90. (Figure 1.)

Also forming part of rocker shaft 410 is a slotted arm member 424, more clearly shown in Figure 26, which is adapted to receive a sliding block 426 which in turn is bolted to a lever 428 by means of stud 430. Lever 428 is rigidly fixed to the end of the bobbin shaft 62. It will thus be seen that rotation of the needle drive shaft 90 will serve to oscillate rocker shaft 410 through the connecting rod 418 and give an oscillating movement to the bobbin shaft 62, thereby operating the several bobbin mechanisms which are of a known kind used in sewing machines and accordingly are not described in detail. Shaft 62 is made sufficiently strong to stand the strain of the number of bobbins it actuates.

A hand wheel 91 is provided for manual operation of the stitching mechanism for adjustment purposes, and is shown in Figure 1, to the right of supporting bracket 340, on clutch shaft 90$^a$.

The clutch O is thrown into and out of engagement with the needle drive shaft 90 by means of the vertical lever 360 which has a clockwise motion induced by the finger 358 as described above. The lever 360 in its clockwise motion, as seen in Figures 5 and 6, engages a pin 432 which is mounted in a lever 434 (Figure 6) which is pivoted at its lower end (see Figure 1) to a bracket 436 by shoulder screw 438, the bracket being mounted on platform 334. The upper end of lever 434 is connected by a link 440 to the lower end of an arm 442, which is pivoted at 444 to bracket 342, and the upper end of which is forked at 446 to engage pins 448 protruding from the hub of clutch member 450. It will therefore be seen that the clockwise motion of the vertical arm 360 will throw the clutch O, for the stitching means, into engagement to be driven through the belt 344 from motor 346, and similarly counter-clockwise movement of arm 360, accomplished by a spring 361 when cam 402 actuates a latch 454, will disengage clutch O at the end of a stitching operation.

Figure 5 shows the position of arm 360 when the machine is stopped and clutch O is disengaged. At this time arm 360 is in its forward position and is engaged with cam 368. When clutch O is engaged projection 348 on vertical rod 332 strikes projection 350 of a bell crank lever pivoted at 352, thereby causing the other arm or depending finger 358 of the bell crank to pivot inwardly on its ball and socket pivot 362 thereby carrying the upper end 366 of arm 360 rearwardly away from projection 367 of cam 368 on needle drive shaft 90 thereby freeing needle drive shaft 90 and allowing it to rotate to initiate a new stitching operation.

When arm 360 is rotated by the bell crank finger 358 it moves back with it the finger or shaft 432 which is threaded into arm 434, and projects laterally from it and behind lever 360 as viewed in Figure 6. Rearward rotation of lever 360 therefore, through pin 432, rotates lever 434 which in turn is pivotally attached to the upper end of link 440 the other end of which is attached to the end of clutch operating fork 442.

When arm 360 is in its rear position it is held out of engagement with cam 368, by means of frictional engagement with lever 454 which, as shown in Figure 8, is pivoted, by pivot 456, to the upper portion of one of the lugs 354 (Figure 6), and at its lower end has the projection or toe 452. Lever 454 is urged into engagement with arm 360 by a tension spring 460 interposed between a shoulder 456a and lever 454.

On the inner side of cam 402 are three lugs 402a, 402b, and 402c corresponding to the ends respectively of each of the three complete sewing cycles of the quilting apparatus which are performed while cam 402 makes one revolution. Cam 402 in rotating causes these lugs to wedge against the end of lever 454. Lever 454 pivoting on pivot 456 releases arm 360 which, as above described, disengages the clutch O and allows pin 366 to engage stop cam 368 at projection 367.

At the end of a stitching operation the rotary cam member 368 is driven in a counter-clockwise direction by needle drive shaft 90, until projection 367 on cam 368 abuts against the upper end of pin 366. The timing mechanism for the needle drive shaft 90 is arranged so that the positive drive of shaft 90 ceases at the moment projection 367 contacts the upper end of pin 366, but the momentum of the cam is sufficient to cause arm 360 to rotate in a clockwise manner, as viewed in Figure 6, thus operating bell crank lever 372 which controls bar 38 which in turn actuates the individual thread cutting members. Arm 360 in rotating in a clockwise direction, as viewed in Figure 6, compresses a spring 462 contained in recess 464 extending transversely of lug 354. Spring 462 is thus compressed during the thread cutting operation and upon the completion of the operation serves to return arm 360 to its initial position, ready for a succeeding sewing cycle. Spring 462 may be adjusted as desired by means of adjustment screw 466.

In order to insure that the individual threads of the multiple sewing means will each be severed, supplementary means are provided by which the cutting action is repeated for each cycle of the stitching means. This supplementary cutting action is driven from a gear 468 (Figure 1) which engages intermittent gear 470 on shaft 472 which in turn actuates crank arm 474 which reciprocates link 476, the upper end of which is connected by stud 478 to the piston head 480, previously referred to, which is slideably contained in a slideway formed between the upwardly extending members 482 and 484 (Figure 7), extending upwardly from frame member 15. Piston head 480 is secured to the lower end of a piston rod or plunger 486 the upper end of which is pivotally connected to the bell crank plate 316 which is pivotally mounted at 487 to support 489 which in turn is secured on the inside of frame member 15. Plate 316 is provided with a counter-weight 317, slideably mounted on bar 319, which can be adjusted by adjusting screw 321. (See Figure 1.) Interposed between the upper portion of link 476 and the piston head 480 is a cam member 488 mounted on stud 478 (Figures 1 and 7). Cam member 488 comprises a lower portion which projects horizontally toward the front of the machine, and an upwardly extending portion 490 shouldered at 492 to engage a roller 494 carried on a lever 496 pivoted to bracket 500, also supported on platform 334. When lever 496 is caused to swing in a clockwise direction as seen in Figure 5, due to the contact of shoulder 492 against roller 494, the end 502 of lever 496, through the right angle extension or bifurcated foot 504 (Figure 9), presses against the upper end of lever 360 moving it in a clockwise direction against the action of spring 462, thereby effecting another cutting operation, in the manner described above. Spring means 495 (Figure 5) may be provided if desired to insure contact between roller 494 and the outer surface or cam surface of the upwardly extending arm 490 of cam member 488.

Thread tensioning means is provided to prevent the loose ends of the needle threads from retracting through the needle eyes respectively, upon being severed by the cutting means, and is best illustrated in Figures 2, 5, 15, 16, and 18. As shown in Figure 5 the timing cam 402 is rotatably mounted in the casing 356. On the peripheral surface of cam 402 three depressions or cut away portions 570 are provided, designed to be engaged, as the cam rotates and at the proper time, by the finger 574 projecting downwardly from arm 572 of a bell crank lever 576 which in turn is pivotally connected at one end, by pivot 578, to the casing 356. The other end 580 of arm 572 is hollow and internally grooved to receive the threaded end portion of a rod 582 which is held in engaged position by nut 584. Rod 582 passes through clearance holes in the plates p and the frame member 11 and is fastened by screws 586 (see Figure 2) to an extension bar 588 which extends substantially the length of the stitching heads.

Referring now more particularly to Figures 15, 15a, and 16, it will be seen that bar 588, shown in cross section in Figure 15, is slideably mounted in slideways 590 provided in three brackets 592 which are bolted, as at 594, to the vertical portion of angle cross support member 13. Mounted on and fastened to the bar 588 by shoulder screws 596 are bell crank levers 600, each of which at one end, 598, rests on a vertically protruding boss 602 of the brackets 592 respectively, and is pivoted by a shoulder screw 604. The other ends 606 of the bell crank levers 600 respectively are adapted to engage, and move in a clockwise direction as viewed in Figure 15, the fingers 608 respectively, each fastened at the lower end, as by welding, to a rectangular pivot block 610 mounted on the brackets 592 respectively by shoulder studs 612 (Figure 15). Welded or otherwise secured to the under side of pivot blocks 610, is a bar 614, extending substantially the full length of the stitching heads, and the supporting brackets 592 are disposed at either end (see Figure 2) and at the center (Figure 16), and bolted as shown to the vertical leg of angle support 13. Bar 614 has at its ends projections 615 adapted to be pivotally mounted at 617 on the insides of brackets 592.

A plurality of laterally extending pins 616, equal in number to the stitching heads 22 to be used, are threaded at their ends to be received in the bar 614 and held in place by lock nuts 618. The rear of the casing 620 of the stitching heads 22, is cut away providing apertures through which the pins 616 extend. Mounted on the other ends of pins 616 as by screws 622, are toed levers 624, which as is well known to those skilled in the sewing machine art are adapted in the forward movement of the pins 616 to engage the upper leg of tension levers 626 respectively, which are pivotally connected to the needle shafts n by shoulder screws 628 respectively, and each has at its lower end a foot 630, curved to fit its needle shaft n and disposed at right angles to the lever 626. The threads are thus engaged individually by the feet 630 respectively and are tensioned against the needle shafts n to prevent retraction of the thread following the cutting operation.

I cause the presser feet 305 (Figure 18), which conventionally are provided to flatten gathers, to rise with needles n to prevent material M from being marked or scratched by needles n during the forward movements of the material. Mounted on one of the horizontal shafts 266 is a split collar 279 (Figures 20 and 21), clamped by screws 281, and having an extending finger 283 designed to strike, during its clockwise movement as viewed in Figure 19, the horizontally extending finger 285 of the L-shaped lever 287. Lever 287 at its other end is fixed to a shaft 289 extending substantially the length of the multiple stitching heads, the shaft in turn oscillating in bearings 291 mounted on the vertical face of channel-like member 268 and angle support 13 respectively, by bolts 293.

A plurality of forked levers 295 (Figures 15 and 19), equal in number to the number of stitching heads used, are clamped to shaft 289, their other ends being forked at 297 to fit the diameter of the top ends 299 of the vertical presser foot shafts 301. The forked levers 295 are designed to engage under and lift up collars 303 mounted on the top ends 299 of shafts 301 respectively when the clamp 220 is elevated. It will thus be seen that the striking fingers 283 serve through levers 287 and 295 to raise presser foot shafts 301 and presser feet 305, thus freeing strip M and at the same time protecting the needles n and preventing the material M as it is advanced from being defaced by contact with the ends of needles n. Presser feet 305 (Figure 18) when raised are below needles n respectively in stop position. The presser feet are lowered by the action of spring means contained within the heads 22 respectively.

Fixed on shaft 289 (see Figures 1ª and 4), is a vertically depending lever 307 which has engaged between its lower forked end, and the angle member 13, a compression spring 309 designed to ease the striking blow of fingers 283 against the L-shaped levers 287 without overcoming the tension of the springs 311 mounted in the casing of the stitching heads 22, as best shown in Figure 19.

It is important that when the apparatus is stopped it be stopped always at a particular moment in its cycle of operation, that moment being when: (1) the sewing means are at rest with (2) all the needles in raised position, after (3) the several threads of the several sewing means have been cut, and after (4) the clamp and presser feet are up, and before (5) the feed motion has begun. The apparatus reaches this point at the end of the fourth of the five steps which comprise each full operating cycle, and which are performed successively as follows:

*1st step.*—(A) Engage clutch 510. (This is accomplished to start the machine initially by pushing lever 564 to the left.) (Figure 1.) (B) Action of cam 292 pushes rack 274 to the right, lowering clamp 220, and, through rods 318 and 332 and bar 369, engages clutch O, starting the several sewing and thread trimming means.

*2nd step.*—Sewing operation while clamp 220 and plate 222 engage and move strip M to give the several lines of stitching for the desired design.

*3rd step.*—Stop sewing, lug on rear of cam 402 (Figure 5), unlatches bar 254, releasing spring action on 360 to disengage clutch O. Lug 367 on cam 368 engages pin 366 to stop sewing heads with needles up.

*4th step.*—Motivated by crank and piston 474–480, bar 314 is pushed to the left and then returned to the right to its initial position with one complete revolution of shaft 472. The motion of bar 314 to the left (Figure 1), pushes rack 374 to the left, raising clamp 220. The downstroke of piston 480 returns bar 314 to the right to its rest position. The same action of piston 480 motivates the thread cutting means for final trim.

*5th step.*—Cams 196, 180 and 134 now working through levers 200, 202, 212 and 174 to levers 136 and 112, motivate the forward and lateral feed motion of strip M, and place the strip in its position for the next operation.

*6th step.*—Cam 292 operates to repeat the steps automatically, which continue automatically until stopped manually when desired.

The means for stopping the apparatus and insuring that it will always stop at the end of the fourth step in its cycle of operation include a clutch collar 516 which is mounted on main shaft 150 and operated through a clutch fork 518 mounted on a shaft 520 which is supported by a bracket 522 mounted on frame member 10. (Figures 10 and 11.) An arm 524 is secured at one end of shaft 520, to the rear of bracket 522 as viewed in Figure 10, and its other end is pivotally connected by pivot 526 to the lower end of a link 528 the upper end of which is connected by pivot 530 to arm 532 of a bell crank-like lever comprising arms 532 and 533, pivoted by pivot shafts 534 to a bracket 536 on plate p on the inside of frame member 10. The upper end of arm 533 is connected by pivot 538 to a cross rod 540 which extends substantially the length of the machine, and at its other end, the right end as viewed in Figure 1, is connected by pivot 542 to the lower end of a lever 544, which in turn is pivotally mounted by pivot 546 (see Figure 5), to the channel-like member 268. The upper end of lever 544 is connected by pivot 548 to latch member 550 which has a downwardly extending end portion 552 which is adapted to engage the upwardly extending end portion 554 of a latch member 556 which is mounted on member 328ᵃ projecting from bar 314, best illustrated in Figure 5. Latch member 556 is rigidly fastened to slide bar 314 through 328ᵃ, and travels back and forth with 314 as it receives motion from piston 480 while raising the clamp during successive cycles of the machine. Latch 556 so travelling cannot engage latch 550 while it is desired to run the machine because in the running position, lever 564 is pushed to the right, as shown in Figure 5, which raises latch 550 above the engaging point.

When it is desired to stop the machine, lever 564 is pushed to the left (Figure 5). Since lever 564 is fixed through shaft 546 to lever 560, but not so keyed to lever 544, this motion of 564 results only in lowering latch 550 to a horizontal position.

When Step 4 begins, the up-stroke of piston 480 pushes latch 556 under latch 550 (now in a horizontal position as shown in Figure 1), and engages by toes 552 and 554 latch 550 with 556. Therefore, at the end of Step 4 just as clamp 220 is raised, but before feed motion described in Step 5 has begun, the down-stroke of piston 480 draws latch 550 to the right (Figure 1), thereby through levers 560–540, et cetera, disengages clutch 510 at the proper moment and the machine stops instantly.

To again start the machine latch member 550 is raised, to the position shown in full lines in Figure 5, when it will be disengaged from latch member 556, and is then further rotated, in a clockwise direction as viewed in Figure 5, to the position shown by dot and dash lines, thereby moving cross rod 540 to the right as viewed in Figure 1, and, through the linkage described above, effecting driving connection between the clutch means and the driving means.

Rotary motion of latch member 550, from the position shown in dotted lines, to the position shown in dot and dash lines, in Figure 5, is transmitted to lever 544 by a lever 560, which, at its lower end, is also pivoted on pivot 546, and which at its upper end has a laterally projecting finger 562 (Figure 5) designed to slide along the lower surface of the latch member 550. The initial movement of a handle 564 on shaft 546 brings finger 562 against the latch member 550 and moves the latch member from its dotted line position to the full line position as shown in Figure 5, when pin 562 will drop into a notch 566 on the under side of latch member 550. Further movement of the pin 562 in a clockwise direction as viewed in Figure 5 will engage the upper portion of the lever 544, moving it in a clockwise direction around the pivot 546 to the position shown in dot and dash lines thereby moving the lower end of lever 544 to the left as viewed in Figure 5, and also moving rod 540 to the left, which causes the clutch to be thrown in and thus starts the operation of the machine. In the initial position pin 562 lies against, or is supported on, angle bracket 568 which serves to limit the anti-clockwise movement of the lever 560 and the handle 564.

The drive for all parts of the apparatus disclosed herein (with the exception of the sewing heads, the bobbin mechanism, the thread cutting means, and the thread tensioning means which are driven from synchronous motor 346 in the specific embodiment of the invention described herein), is transmitted from any suitable source of energy (not shown), to main drive shaft 150, as through belt 508 and clutch pulley 510 on the main drive shaft 150 (see Figures 1, 10 and 11).

A hand wheel 511, mounted on main drive shaft 150, and to the extreme left of the machine as viewed in Figure 1, is provided for manual operation of the machine and serves to facilitate proper timing of the cams and coacting elements.

The apparatus, one embodiment of which is described herein, has the great advantage that it can take its place with other machines designed to operate on a continuously moving strip, and can simultaneously form a number of quilt designs or lines of stitching which are disconnected.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is,

1. Apparatus for making comfortables which comprises a stationary work-bed for supporting materials to be formed into comfortables, means for advancing material intermittently over said work-bed, means for engaging the materials on the work-bed between its intermittent forward movements comprising a clamp member, a rotatable shaft positioned above said clamp member, a plurality of flexible members the lower ends of which are connected to said clamp member, a plurality of attachment members on said shaft to which the upper ends of said members are attached respectively, pinion means on said shaft, a rack positioned in operative relation to said pinion means, and means for actuating said rack to periodically rotate said shaft and raise said clamp including a drive shaft, a crank, an intermittent gear on said drive shaft through which said crank is actuated by said drive shaft, a bell crank, and a piston interconnecting said crank and said bell crank.

2. Apparatus for making comfortables which comprises a number of sewing units, means for supporting materials to be formed into comfortables in operative relation to said sewing units, means for actuating said needles to sew together said materials thereby forming a quilted strip and means for advancing the materials including a pair of driving rolls between which the quilted strip is led, means for actuating said rolls to pull the strip forward continuously, and means intermediate said rolls and said work supporting means adapted to engage the quilted strip and to be reciprocated back and forth along the line of travel of the quilted strip to thereby pull the said strip forward intermittently leaving the strip with enough slack during its rearward movement so that the continuous forward feeding action of said rolls is not interrupted.

3. Apparatus for making comfortables which comprises a number of sewing units, means for supporting materials to be formed into comfortables in operative relation to said sewing units, means for actuating said needles to sew together said materials thereby forming a quilted strip and means for advancing the materials including a pair of driving rolls between which the quilted strip is led, means for actuating said rolls to pull the strip forward continuously, and means intermediate said rolls and said work supporting means adapted to engage the quilted strip and to be reciprocated back and forth along the line of travel of the quilted strip to thereby pull the said strip forward intermittently leaving the strip with enough slack during its rearward movement so that the continuous forward feeding action of said rolls is not interrupted, a carriage upon which said reciprocable quilt engaging means is mounted, and means for periodically reciprocating said carriage laterally with respect to the forward travel of the quilted strip.

4. In the manufacture of comfortables and the like in a continuous operation the steps of superimposing a plurality of elements to form a multi-ply fabric, supporting the fabric on a smooth support surface, performing a plurality of stitching operations on said fabric while moving it in a circular path, and advancing the quilted fabric continuously while moving the unquilted elements over said support surface intermittently without interrupting the said continuous forward movement of the quilted fabric.

5. The method of making comfortables comprising bringing together two continuous face fabrics and an interposed filling, securing said fabrics together at their longitudinal edges to form a continuous compound fabric having its face fabrics united at their longitudinal edges, advancing the compound fabric intermittently through a quilting station, quilting the compound fabric with a number of disconnected lines of stitching simultaneously, and advancing the quilted fabric continuously from said quilting station to a cutting station.

6. Apparatus for making comfortables from a multi-ply fabric which comprises, a number of sewing heads, means for actuating said sewing heads simultaneously to each sew a predetermined number of stitches and cut off a thread including clutch means interconnecting said sewing heads and said actuating means, means for moving said fabric relative to said sewing heads intermittently in an endless path, means for driving said actuating means in timed relation to the said movements of the fabric, means for advancing the fabric intermittently between said sewing operations, and stop means settable at any time and operative so that the apparatus will stop only between sewing operations with the needles of said sewing heads in raised position said stop means comprising a first latch member, control means for raising and lowering said first latch member, means interconnecting said first latch member and said clutch means, and a second latch member reciprocable in timed relation to the operation of said sewing heads, said first latch member being positioned in the path of reciprocation of said second latch member and adapted to engage therewith only when said second latch member reaches a predetermined point in its reciprocating travel.

7. In apparatus for quilting a strip of material comprising a plurality of elements, the combination of a work-bed, means for advancing a portion of the strip continuously, means intermediate the last mentioned means and the work-bed for advancing another portion of the strip step by step, means acting simultaneously with the intermittent forward movement of said portion of the strip to move it laterally, alternately with successive forward movements of the said portion of the strip, to one side of the line of travel of the strip and then to the other side of the line of travel of the strip, and means for simultaneously stitching a number of independent quilt designs in the portion of the strip which is moved intermittently, during each dwell of the said strip between forward movements thereof.

JAMES REID JOHNSON.

REFERENCES CITED

The following references are of record in the file of this patent:

UNITED STATES PATENTS

| Number | Name | Date |
|---|---|---|
| 340,863 | Cole | Apr. 27, 1886 |
| 421,816 | Cole | Feb. 18, 1890 |
| 423,856 | Coles | Mar. 18, 1890 |